June 18, 1957  G. MARULLO ET AL  2,796,426
PROCESS FOR THE SYNTHESIS OF ACRYLONITRILE
FROM ACETYLENE AND HYDROGEN CYANIDE
Filed Sept. 27, 1954.
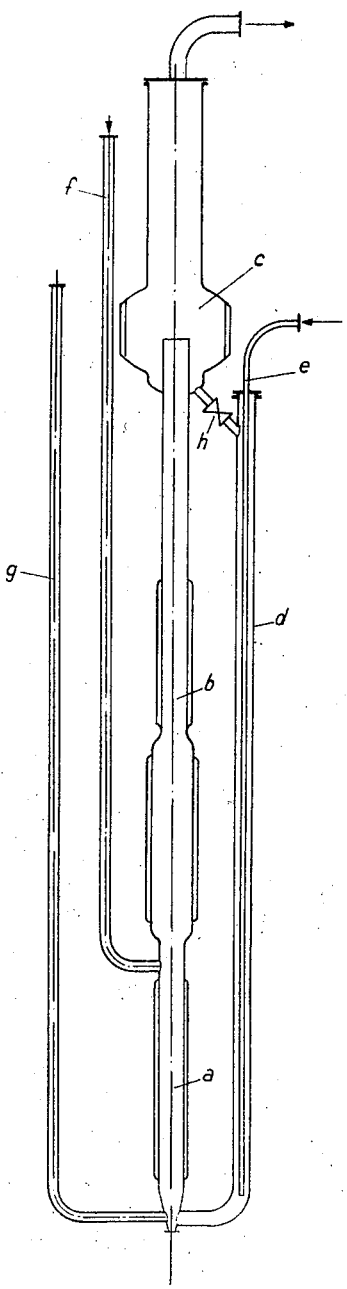
INVENTORS
Gerlando Marullo, Umberto Maffezzoni
and Marco Agamennone
BY
Kniget Vns.
Attorneys 2,796,426
Patented June 18, 1957

2,796,426
PROCESS FOR THE SYNTHESIS OF ACRYLONITRILE FROM ACETYLENE AND HYDROGEN CYANIDE

Gerlando Marullo, Umberto Maffezzoni, and Marco Agamennone, Milan, Italy, assignors to Montecatini, Società Generale per l'Industria Mineraria e Chimica, a corporation of Italy Application September 27, 1954, Serial No. 458,608

Claims priority, application Italy October 17, 1953

6 Claims. (Cl. 260—465.3)

The present invention relates to a process and device for the synthesis of acrylonitrile from acetylene and hydrogen cyanide.

Acrylonitrile may be prepared by reacting acetylene and hydrogen cyanide in the presence of catalysts, generally provided in the from of aqueous solutions of complex cuprous salts, such as CuCl, with alkaline or ammonium salts, such as NaCl, KCl or NH$_4$Cl.

The devices used for performing this reaction are of different type, depending on whether the required agitation of the catalyst is attained by means of mechanical stirrers or by circulating gas through the catalyst liquid.

In actual practice, devices of the latter type have proved more suitable, because the agitation is adjustable at will, within certain limits, by circulating an inert gas, e. g. nitrogen, together with the reagents. A rapid catalyst circulation may be obtained in a reactor of this type if built in form of a tower, provided with a down pipe near the top in order to return continuously overflowing catalyst solution to the bottom of the reactor.

Feeding of the reactants may be achieved in different ways. For example, gaseous HCN may be mixed with acetylene and the mixture introduced into the reactor, or, preferably, the reactants may be fed separately.

The molar ratio between $C_2H_2$ and HCN may be varied within very wide limits. As a rule, an excess of acetylene is employed, the molar ratio reaching values as high as 5:1 and 10:1. High partial pressures of acetylene are used in order to increase its solubility in the catalyst solution because, at equal pressure, the solubility of acetylene is much lower than that of hydrogen cyanide. By increasing the partial pressure of acetylene in this manner, molar ratios are obtained in the liquid phase which closely approximate the stoichiometric requirements. Moreover, an excess of gas is necessary to remove the reaction product from the catalyst; to this end an inert gas may be added, the presence of which simultaneously lessens the danger of polymerization reactions on the part of the acetylene, otherwise leading to the formation of undesirable by-products (mono-, divinylacetylene, etc.).

However, there are considerable disadvantages inherent in all processes and devices, either proposed or actually utilized, in which both the agitation and the catalyst circulation depend upon the velocity of the reaction gases, with or without the admixture of an inert gas.

In fact, the amounts and velocity of the gas introduced in order to meet the physico-mechanical requirements of the system with respect to agitation of the catalytic liquid and driving out of the reaction product, are not necessarily the most suitable to satisfactorily promote the synthesis of acrylonitrile. In short, this kind of operation does not permit adjustment of the contact time between catalyst and reactants according to the requirements of the reaction.

The yields attainable by using the aforesaid processes and devices are therefore insufficient and nitrile production per volume unit of the reactor is low.

It has now been found that substantial improvements both in the yields and in the reactor output may be attained by modifying the structure of the reactor to permit a two step operation.

It is, therefore, an object of the present invention to provide an improved device for the synthesis of acrylonitrile from acetylene and hydrogen cyanide, and it is another object of the invention to provide an improved method for the production of acrylonitrile from acetylene and hydrogen cyanide.

These and other objects will become obvious from the following detailed description and the accompanying drawing, showing a schematic view of the herein claimed device.

The new reactor is composed of three principal parts, designated as parts $a$, $b$ and $c$, which have the following functions:

In the zone $a$, hydrogen cyanide is reacted with 100% pure acetylene. The entire hydrogen cyanide is fed to zone $a$ by means of the pipe $e$, designed to also feed the stoichiometrically required equivalent amount or, desirably, a lower amount of pure acetylene; additional amounts of the latter may be introduced by means of pipe $g$, so that, within the zone $a$, the molar ratio $C_2H_2$/HCN will attain a maximum of 1. The zones $a$ and $b$ of the reactor are filled with strata of a catalyst of the aforedescribed type, which is maintained within the zone $a$ at temperatures ranging from 70° to 100° C., preferably at 80° C.

A large volume of acetylene diluted with nitrogen is introduced into the zone $b$ by means of pipe $f$. The reaction is thereby completed, the catalyst is agitated and the nitrile formed is removed from the liquid phase.

The total amount of acetylene supplied is adjusted so as to produce an over-all molar ratio between $C_2H_2$ and HCN which ranges from 6:1 to 12:1 and is preferably held at 10:1. The temperature of zone $b$ is kept between 70° and 100° C., preferably at 85° C. Advantageously, the zones $a$ and $b$ should be kept, as far as possible, at slightly different temperatures, and zone $a$ particularly should be kept at a temperature not higher than 80° C., in order to provide the proper solubility conditions for the reactants in this zone of the catalyst and to thus promote the development of the reaction.

The separation of the gas from catalyst liquid occurs in zone $c$; the gas is conveyed to an absorption device for the nitrile while the catalyst is recycled to the reactor bottom by means of valve $h$ and pipe $d$.

In this way, by suitably adjusting the circulation rate of the catalyst passing through valve $h$, while a satisfactory agitation of the catalyst and an efficient withdrawal of the product in zone $b$ are achieved, it is possible to control the contact time of the reactants in zone $a$ and attain a gradient of concentration throughout the catalyst, which is partly responsible for the increase in yield.

A reaction course in two distinct steps, which characterizes this process, offers the following advantages:

(1) The yield based on the acetylene used is substantially improved, since the reaction occurs for the most part in the presence of an excess of hydrogen cyanide.

(2) The reactor output is improved since the reaction occurs for the most part at maximum concentration of reactants in the zone of highest hydrostatic pressure.

(3) The circulation rate of the catalyst may be controlled at will and regulated so as to be most advantageous for the process.

The following examples are given to furnish further details of our process, without any intent, however, of limiting the invention thereto. Gas volumetric terms such as cubic meters (cu. m.) used in the examples, refer to measurements at 1 atm. pressure and standard temperature.

Example 1

A reactor of the type shown in the accompanying drawing is charged with 600 liters of a catalyst liquid containing 40% CuCl, 20% NaCl and 7% KCl in aqueous solution, acidified with HCl.

During an 85-hour run, 8.5 kg./hour of hydrogen cyanide gas, corresponding to 14.2 g./l. (gram per liter) of catalyst, are fed through pipe $e$ into zone $a$ of the device.

Simultaneously, 5.3 cu. m./hour of acetylene, corresponding to 90% of the theoretical amount based on hydrogen cyanide present, are introduced through pipe $g$, and about 90 cu. m. of acetylene, diluted to 60% with nitrogen, through pipe $f$.

Thus, the total ratio between $C_2H_2$ and HCN is 10:1. The catalyst is kept at 80°–90° C. Under these conditions, 100 liters of gas at the reactor outlet contain 0.5 to 1 g. HCN.

On the average, the acrylonitrile yield is 14.35 kg./hour which is equivalent to an 86% yield based on the hydrogen cyanide, while, based on the average consumption of acetylene (8.7 kg. per hour), the yield is 81%.

Example 2

Using the same reactor and the same catalyst as in Example 1, the valve $h$ is adjusted so as to produce a 50% reduction of the catalyst circulation through pipe $d$.

Catalyts temperatures, HCN concentration rate of discharge as well as molar ratios (total and partial) between $C_2H_2$ and HCN are the same as in Example 1.

12 kg./hour of HCN gas, corresponding to 20 g./l. of catalyst are fed through pipe $e$, during a run of 100 hours. Simultaneously, 7.5 cu. m./hour of acetylene, corresponding to 90% of the theoretical amount based on HCN present, are introduced through pipe $g$, and about 130 cu. m. of acetylene, diluted to 60% with nitrogen, through pipe $f$. On the average, 21.1 kg. of acrylonitrile are obtained per hour, which is equivalent to a 90% yield based on the hydrogen cyanide. The average consumption of acetylene is 12.3 kg./hour, corresponding to an 85% yield. Since, in addition, 0.6 kg./hour of HCN are recovered from the reaction gases, the actual yield reaches 94%.

Because of the small extent of side reactions, the crude nitrile obtained in this manner is of such high purity that further purification to a product particularly suitable for polymerization to spinnable products is very simple.

Example 3

The process is carried out according to the conventional technique. using only one reaction step. Both yields and production capacity of the catalyst are substantially lower.

For this purpose, the same reactor and the same catalyst are employed as in the previous examples, but the introduction of $C_2H_2$ through pipe $g$ is eliminated, so that all of the $C_2H_2$ is fed through pipe $f$, while the $C_2H_2$/HCN ratio, the temperatures of the catalyst and the HCN concentration in the gas at the reactor outlet are left unchanged.

During a 70-hour run, an average of only 5.5 kg./hour of HCN corresponding to 9.2 g./l. of catalyst could be fed to the reactor, resulting in 8.9 kg./hour of acrylonitrile which corresponds to a yield of 82.5% based on HCN and 78%, if based on $C_2H_2$ consumption.

We claim:

1. In the process for the manufacture of acrylonitrile from hydrogen cyanide and acetylene in the presence of a catalyst containing cuprous salts in acidified aqueous solution, the improvement which comprises entering gaseous hydrogen cyanide and pure acetylene at a ratio of about 0.8–1.0 mol equivalents of acetylene per one mol equivalent of hydrogen cyanide at the bottom of a lower stratum of a column of said catalytic solution maintained at a temperature of 80° C., and entering an excess of acetylene diluted with an inert gas at the bottom of an intermediary stratum of said column maintained at a temperature ranging from 80 to 100° C.

2. In the process for the manufacture of acrylonitrile from hydrogen cyanide and acetylene in the presence of a catalyst containing cuprous salts in acidified aqueous solution, the improvement which comprises entering gaseous hydrogen cyanide and pure acetylene at a ratio of 0.8 mol equivalents of acetylene per one mol equivalent of hydrogen cyanide at the bottom of a lower stratum of a column of said catalytic solution maintained at a temperature of 80° C., and entering an excess of acetylene diluted with an inert gas at the bottom of an intermediary stratum of said column maintained at a temperature of about 85° C.

3. In the process for the manufacture of acrylonitrile from hydrogen cyanide and acetylene in the presence of a catalyst containing cuprous salts in acidified aqueous solution, the improvement which comprises entering gaseous hydrogen cyanide and pure acetylene at a ratio of about 0.8–1.0 mol equivalents of acetylene per one mol equivalent of hydrogen cyanide at the bottom of a lower stratum of a column of said catalytic solution maintained at a temperature of 80° C., and entering at the bottom of an intermediary stratum maintained at a temperature ranging from 85 to 100° C. an excess of acetylene which is diluted with about 40% of an inert gas and is sufficient to raise the over-all molar ratio between acetylene and hydrogen cyanide to a ratio ranging from 6:1 to 12:1.

4. In the process for the manufacture of acrylonitrile from hydrogen cyanide and acetylene in the presence of a catalyst containing cuprous salts in acidified aqueous solution, the improvement which comprises entering gaseous hydrogen cyanide and pure acetylene at a ratio of about 0.8–1.0 mol equivalents of acetylene per one mol equivalent of hydrogen cyanide at the bottom of a lower stratum of a column of said catalytic solution maintained at a temperature of 80° C., and entering at the bottom of an intermediary stratum maintained at a temperature of about 85° C. an excess of acetylene which is diluted with about 40% of an inert gas and is sufficient to raise the over-all molar ratio between acetylene and hydrogen cyanide to about 9:1.

5. The improvement according to claim 4 wherein said hydrogen cyanide and said acetylene are entered separately into the bottom portion of the lower stratum of said column.

6. In the process for the manufacture of acrylonitrile from hydrogen cyanide and acetylene in the presence of a catalyst containing cuprous salts in acidified aqueous solution, the improvement which comprises entering the equivalent of 8.5 kg./hour of gaseous hydrogen cyanide into the bottom portion of a lower stratum of a column containing the equivalent of 600 liters of said catalytic solution, entering the equivalent of 5.3 cu. m./hour of acetylene into the bottom portion of the lower stratum of said column, maintaining the lower stratum of said column at a temperature of substantially 80° C., entering the equivalent of 90 cu. m./hour of acetylene diluted with 40% nitrogen into the bottom portion of an intermediary stratum of said column, maintaining the intermediary stratum of said column at a temperature of substantially 85° C., recirculating overflow of catalytic solution from the top portion of the upper stratum of said column to the bottom portion of the lower stratum of said column, removing gaseous discharge and separating acrylonitrile from the gaseous discharge.

References Cited in the file of this patent

UNITED STATES PATENTS

| | | |
|---|---|---|
| 2,579,638 | Zwilling et al. | Dec. 25, 1951 |
| 2,649,472 | Lovett | Aug. 18, 1953 |
| 2,692,276 | Goerg et al. | Oct. 19, 1954 |